United States Patent [19]

Pinsky et al.

[11] 4,316,879
[45] Feb. 23, 1982

[54] STABILIZED SODIUM CARBONATE PEROXIDE PREPARATION METHOD

[75] Inventors: Michael L. Pinsky, Mount Holly; Joseph H. Finley, Metuchen; Charles W. Lutz, Princeton, all of N.J.

[73] Assignee: FMC Corporation, Philadelphia, Pa.

[21] Appl. No.: 807,698

[22] Filed: Jun. 17, 1977

[51] Int. Cl.³ .............................................. C01B 15/10
[52] U.S. Cl. ................. 423/265; 423/415 P; 252/186
[58] Field of Search ............... 423/265, 268, 272, 415, 423/415 P; 252/186

[56] References Cited

U.S. PATENT DOCUMENTS

| | | | |
|---|---|---|---|
| 3,661,789 | 5/1972 | Corey et al. | 252/186 |
| 3,677,679 | 7/1972 | Yanush | 423/415 P |
| 3,766,078 | 10/1973 | Kowalski | 252/186 |
| 3,860,694 | 1/1975 | Jayawant | 423/307 |
| 3,932,295 | 1/1976 | Fujino et al. | 252/102 |
| 3,979,318 | 9/1976 | Tokiwa et al. | 252/186 |
| 4,025,609 | 5/1977 | Matsunaga | 423/415 P |
| 4,120,812 | 10/1978 | Lutz | 252/186 |
| 4,131,562 | 12/1978 | Lutz et al. | 252/186 |

FOREIGN PATENT DOCUMENTS 28-3418  7/1953  Japan .
1398876  6/1975  United Kingdom .

*Primary Examiner*—Earl C. Thomas
*Attorney, Agent, or Firm*—Christopher Egolf

[57] ABSTRACT

Sodium carbonate peroxide stabilized against loss of its active oxygen content is prepared by incorporating into sodium carbonate peroxide an ethylene oxide-derivative stabilizing agent selected from the group consisting of polyethylene glycol, polyethoxy fatty acid tertiary amines, diamines and quaternary ammonium salts thereof, N,N-polyethoxy fatty acid amides and polyethoxy fatty acid esters and recovering the sodium carbonate peroxide as a dry, free-flowing solid.

5 Claims, No Drawings

STABILIZED SODIUM CARBONATE PEROXIDE PREPARATION METHOD

BACKGROUND OF THE INVENTION

This invention relates to a method for the preparation of a stable sodium carbonate peroxide. More particularly, an ethylene oxide-derived stabilizing agent is incorporated into sodium carbonate peroxide to stabilize the dry, free-flowing sodium carbonate peroxide solid against loss of its active oxygen.

Sodium carbonate peroxide, alternatively known as sodium carbonate peroxyhydrate or sodium percarbonate, has the formula $Na_2CO_3 \cdot 1\frac{1}{2}H_2O_2$ and is typically a white, free-flowing crystalline solid. Because sodium carbonate peroxide releases hydrogen peroxide when placed in aqueous solution, this peroxygen compound is useful as a bleaching and cleansing agent, typically in household detergent formulations.

Many processes are described in the prior art for the preparation of sodium carbonate peroxide (occasionally abbreviated as SCP in this disclosure) from the basic reaction of hydrogen peroxide with sodium carbonate. These include the "dry" process disclosed in U.S. Pat. No. 3,860,694, wherein hydrogen peroxide is reacted with moist sodium carbonate in particulate form and the reaction mass is thereafter dried to yield the SCP product, and the "wet" process such as disclosed in U.S. Pat. Nos. 3,870,783 and 3,801,706, wherein aqueous solutions of sodium carbonate and hydrogen peroxide are mixed in a reactor and the sodium carbonate peroxide is crystallized from solution, thereafter being recovered as a dry SCP product. These prior art methods include both continuous and batch methods for the preparation of sodium carbonate peroxide.

A common drawback associated with all of these prior art processes is the instability of the sodium carbonate peroxide crystallized solid resulting in loss of its active oxygen content. Heavy metal impurities, such as iron, copper, magnesium, and lead, are believed responsible for catalyzing the decomposition of sodium carbonate peroxide. These metallic contaminants are typically present in the sodium carbonate raw material or may occasionally be introduced into the SCP product from the process equipment.

The use of stabilizing agents to minimize the heavy metal-accelerated decomposition of sodium carbonate peroxide is well established in the prior art. Several approaches are taught in the prior art for utilizing stabilizing agents in the preparation of a stable sodium carbonate peroxide. In one such method, described in British Pat. No. 1,398,876, the stabilizing agent (mono- or di-fatty ester of polyalkylene glycol or amide of amine-terminated polyalkylene glycol) is applied as a coating to the dry, crystalline SCP product. This method, however, is ineffective against decomposition occurring in the SCP crystals formed during their preparation by the wet process and can only be used to stabilize SCP after it has been recovered and dried.

A second procedure, described in U.S. Pat. No. 3,870,783, treats the raw materials rather than the final dry SCP product. In this method, heavy metal contaminants present in the aqueous sodium carbonate reactant are complexed and passivated by treatment with a soluble magnesium salt or magnesium oxide prior to reaction of the sodium carbonate with hydrogen peroxide.

A third approach, utilized in U.S. Pat. Nos. 3,677,697, 3,801,706, 3,860,694 and 3,870,783 involves the reaction of sodium carbonate with hydrogen peroxide in the presence of one or more stabilizing agents. These prior art patents teach that suitable stabilizing agents for use in this method include such diverse compounds as water soluble magnesium salts, sodium silicate, magnesium silicate, ethylenediamine tetraacetic acid and benzoic acid.

The ability of a particular compound or material to function as an effective stabilizing agent is unpredictable, as evidenced by the diverse nature of the group of compounds noted above. For example, some sequestering agents (sodium pyrophosphate) may be utilized as stabilizing agents, but the mere fact that a compound is a sequestering agent does not ensure that it will perform effectively as a stabilizing agent for sodium carbonate peroxide. The absence of this prior art of specific knowledge regarding the physical and/or chemical mechanism by which stabilizers for SCP function is one factor that contributes to the inability to predict which compositions will yield superior results as stabilizing agents for SCP.

SUMMARY OF THE INVENTION

In accordance with the present invention, sodium carbonate peroxide is stabilized against loss of its active oxygen content by the incorporation of a stabilizing amount of an ethylene oxide-derivative stabilizing agent into the sodium carbonate peroxide and recovering the stabilized sodium carbonate peroxide as a dry, free-flowing solid.

The stabilizing agent utilized in the method of the present invention is selected from the group of ethylene oxide derivatives consisting of:

(a) polyethylene glycols, having an average molecular weight of from 200 to 50,000;

(b) polyethoxy fatty acid tertiary amines, diamines and quaternary ammonium salts thereof, specifically, tertiary amines and tertiary lower alkyl diamines and quaternary ammonium salts thereof wherein the N-substituents are selected from (i) polyoxyethylene radicals having 1 to 50 ethylene oxide units and (ii) linear alkyl or alkenyl radicals having from 10 to 20 carbon atoms, provided that at least one N-substituent per molecule is selected from each of (i) and (ii) and the total number of ethylene oxide units per molecule is fewer than 75 units;

(c) N,N-polyethoxy fatty acid amides, specifically, tertiary amides wherein the amine moiety contains two polyoxyethylene N-substituents having a combined total of from 2 to 50 ethylene oxide units and wherein the acid moiety contains a linear alkyl or alkenyl radical having from 10 to 20 carbon atoms; and (d) polyethyoxy fatty acid esters wherein the polyoxyethylene moiety contains from 1 to 50 ethylene oxide units and wherein the acid moiety contains a linear alkyl or alkenyl radical having from 10 to 20 carbon atoms.

The stabilizing agent is incorporated into the sodium carbonate peroxide in a stabilizing amount, between from a 0.1 to 5.0% by weight, based on the weight of sodium carbonate peroxide.

The stabilizing agent is preferably incorporated into the sodium carbonate peroxide during its preparation by the reaction of sodium carbonate with hydrogen peroxide in aqueous solution. Sufficient stabilizing agent is provided in the aqueous reaction medium to assure incorporation of a stabilizing amount of agent in the sodium carbonate peroxide crystallized from solution.

The crystallized sodium carbonate peroxide is subsequently filtered from solution and dried by conventional means to obtain a dry free-flowing solid product, preferably containing less than 1% moisture, that is stabilized against loss of its active oxygen content.

DETAILED DESCRIPTION

The stabilizers for sodium carbonate peroxide that are utilized in the method of the present invention may be characterized as derivatives of ethylene oxide.

The first group of ethylene oxide-derived stabilizing agents (a term equivalent in meaning to stabilizers, for purposes of this disclosure) comprises polyethylene glycols, particularly those glycols having an average molecular weight of from 200 to 50,000. Polyethylene glycols are characterized by the general formula $H(OCH_2CH_2)_n OH$ in which n is an integer of about 5 to 1140 for molecular weights of from 200 to 50,000.

Polyethylene glycols having an average molecular weight of from 300 to 20,000 are preferred. Especially good stabilization is obtained with polyethylene glycol having an average molecular weight around 6,000, so use of this molecular weight glycol in the present invention is most preferred. Polyethylene glycols suitable for use in the claimed invention are available commercially from Union Carbide Corporation under the trademark Carbowax in various numbered grades that indicate the approximate average molecular weight, e.g., Carbowax 6000.

The second group of ethylene oxide-derived stabilizing agents consists of certain polyethoxy fatty acid tertiary amines, tertiary lower alkyl diamines and their quaternary ammonium salts. These tertiary amines and diamines and quaternary salts thereof comprise compounds wherein the substituents on the amine nitrogen atoms (designated hereinafter as "N-substituents") are selected from:

(i) polyoxyethylene radicals having 1 to 50 ethylene oxide units and
(ii) linear alkyl or alkenyl radicals having from 10 to 20 carbon atoms, provided that at least one N-substituent is selected from each of (i) and (ii) and that the total number of ethylene oxide units per molecule is fewer than 75 units.

The tertiary amines that are preferred for use in the present method contain one linear alkyl or alkenyl radical and two polyoxyethylene radicals. The preferred total number of ethylene oxide units per molecule averages from 2 to 15. Such preferred polyethoxy fatty acid tertiary amines are represented by the general formula

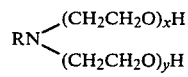

in which R is a linear alkyl or alkenyl radical having from 10 to 20 carbon atoms and x and y are integers whose sum averages from 2 to 15.

The tertiary diamines are lower alkyl diamines, wherein the lower alkyl contains from 1 to 6 carbon atoms, preferably 1 to 4. The most preferred diamines contain three carbon atoms, i.e., 1,3-propanediamines. The diamines preferably contain as substituents on the amine nitrogen atoms, one linear alkyl or alkenyl radical and three polyoxyethylene radicals, the total number of ethylene oxide units per molecule averaging from 3 to 15. Such preferred tertiary diamines are represented by the general formula

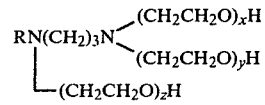

in which R is a linear alkyl or alkenyl radical and x, y and z are integers whose sum averages from 3 to 15.

The quaternary ammonium salts of these tertiary amines and diamines are typically prepared by the addition of methyl chloride to the amine. Other compounds conventionally used to prepare quaternary ammonium salts may likewise be used to form suitable quaternary ammonium salts from these tertiary amines and diamines.

Polyethoxy tertiary amines, tertiary lower alkyl diamines and quaternary ammonium salts that perform very satisfactorily in the method of the present invention are available commercially from Armak Company under the trademarks Ethomeen, Ethoduomeen and Ethoquad, respectively.

The third group of ethylene-oxide derived stabilizers for sodium carbonate peroxide are N,N-polyethoxy fatty acid amides. These tertiary amides comprise compounds containing two polyoxyethylene N-substituents having a combined total of from 2 to 50 ethylene oxide units and wherein the acid moiety of the amide contains a linear alkyl or alkenyl radical having from 10 to 20 carbon atoms. The N,N-polyethoxy fatty acid amides of this group are represented by the general formula

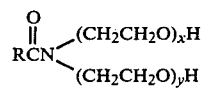

in which R is a linear alkyl or alkenyl radical having from 10 to 20 carbon atoms and x and y are integers whose sum averages from 2 to 50. Suitable polyethoxy fatty acid amides for use in the present method are available commercially from Armak Company under the trademark Ethomid.

The final group of ethylene oxide-derived stabilizing agents comprise polyethoxy fatty acid esters wherein the polyethylene moiety contains from 1 to 50, and preferably averaging from 1 to 15, ethylene oxide units and wherein the acid moiety contains a linear alkyl or alkenyl radical having between 10 to 20 carbon atoms. These polyethoxy fatty acid esters are represented by the general formula

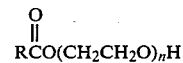

in which R is a linear alkyl or alkenyl radical having from 10 to 20 carbon atoms and n averages from 1 to 50. Polyethoxy fatty acid esters that perform satisfactorily in the present method are available commercially from Armak Company under the trademark Ethofat.

Those compounds among the ethylene oxide-derived stabilizing agents described above which contain polyoxyethylene N-substituents generally have such polyoxyethylene radicals terminated by a hydroxyl group.

The terminal hydroxyl group may, if so desired, be esterified, sulfated or the like.

The linear alkyl or alkenyl radicals which are likewise present in certain of the above-mentioned compounds are most conveniently obtained from fatty acid sources such as tallow, soya or coconut oil. Such fatty acids are mixtures containing both saturated (alkyl) as well as unsaturated (alkenyl and also some alkynyl) long chain aliphatic "fatty" radicals which may have from 10 to 20 carbon atoms, typically from 12 to 18 carbon atoms.

In the preferred manner of practicing the present invention, the stabilizing agent is selected from only one of the four ethylene oxide-derivative groups. Mixtures of stabilizing agents chosen from more than one such group are often less effective stabilizers for SCP, but mixtures of stabilizing agents chosen from one group normally give satisfactory results.

It should be noted, however, that the stabilizing agents of the present invention can be used, often with unexpectedly good results, in conjunction with other stabilizing sytems. By way of illustration, the sodium carbonate feed solution may be treated with magnesium oxide or soluble magnesium salts (such as disclosed in U.S. Pat. No. 3,870,783) prior to being fed into the sodium carbonate peroxide reaction zone where an ethylene oxide-derivative stabilizing agent is utilized in the method of the present invention. The resultant stability of the recovered, dry sodium carbonate peroxide is generally improved over that which is achieved by use of either stabilizing system alone.

The amount of stabilizing agent utilized in the method of the present invention may be varied according to the degree of stabilization desired in the sodium carbonate peroxide. Useful concentrations of stabilizing agent incorporated into the sodium carbonate peroxide range from about 0.01% to 5% by weight based on the weight of the SCP. Preferably the stabilizing agent is incorporated into the sodium carbonate peroxide in an amount of from 0.05% to 2.0% by weight based on the weight of the SCP.

Concentrations of stabilizing agent in the preferred range, i.e., from 0.05% to 2% by weight, produce sodium carbonate peroxide having a very satisfactory degree of stability against loss of its active oxygen. The higher concentrations in the preferred range generally yield a higher degree of stabilization and thus are most preferred.

Amounts of stabilizer below 0.01% tend to provide marginal stability in comparison with the equivalent unstabilized sodium carbonate peroxide. Levels of stabilizing agent in excess of 5% by weight may be utilized, and the stabilization obtained will be satisfactory. However, at such high levels of stabilizing agent incorporated in the SCP, there is a tradeoff between improved stabilization at the expense of SCP purity. The optimum balance between SCP stability and purity (as SCP) must be determined by the intended end use for the stabilized sodium carbonate peroxide product. This optimum value for the amount of stabilizer incorporated into the SCP typically lies within the range 0.01% to 5%.

In the method of the present invention, the stabilizing agent is incorporated into the crystal matrix of the sodium carbonate peroxide, in contrast to being coated onto the surface of the dry SCP solid product as in other stabilization methods. The manner in which the stabilizing agent is incorporated into the sodium carbonate peroxide is not critical, and any of several procedures may be used. If possible, the method of addition utilized should be compatible with the existing SCP manufacturing process so that the stabilizing method of the present invention can be implemented with minimal modification to the SCP manufacturing process.

In the preferred method of incorporating the stabilizing agent into the SCP, the stabilizer is added to the reaction medium in which sodium carbonate peroxide is prepared by the wet process. The stabilizing agent may be introduced to the reaction medium either before, during or after the reaction of sodium carbonate and hydrogen peroxide, either in aqueous solution or in undiluted form. The stabilizing agent is present in the aqueous reaction medium during the formation of sodium carbonate peroxide and thereby is incorporated into the crystal structure of the SCP upon its formation and crystallization from solution.

In this manner the stabilizing agent is incorporated into the crystal structure of the solid sodium carbonate peroxide and thus assures good SCP stability against loss of active oxygen both while the SCP is present in the aqueous reaction medium and, subsequently, after its recovery as a dry, free-flowing solid product. The stabilization method of the present invention consequently permits a stabilized sodium carbonate peroxide product to be recovered in good yield because the stabilizing agent is present during all phases of the SCP manufacturing process: reaction of the sodium carbonate and hydrogen peroxide feed solutions to form sodium carbonate peroxide; crystallization of the SCP from the aqueous reaction medium; separation of the SCP crystals from the mother liquor; and drying of the recovered SCP solid product.

The precise means by which the stabilizing agent is introduced into the reaction medium in the preferred method has little effect on the stabilization provided subsequently by its incorporation into the SCP solid. The stabilizing agent may be metered directly into the reactor (which may also serve as a crystallizer for the SCP product) or injected via a side stream. The stabilizer may be in aqueous solution or used in undiluted form. Practical considerations, such as the physical state (viscous liquid or solid) of some of the stabilizing agents and the small amounts required for stabilization, make introduction of the stabilizing agent by way of solution the preferred technique. The temperature of the stabilizing agent or its solution is not critical and normally is ambient or slightly above, since the reaction medium is typically maintained at from 25° C. to 35° C. The stabilizer may be added continuously or intermittently, the sole requirement being that sufficient stabilizer be present in the aqueous reaction medium to provide an SCP solid containing the desired level of stabilizer.

The precise concentration of stabilizer required in the aqueous reaction medium to provide for a stabilizing amount of stabilizer in the SCP solid product, namely, 0.01% to 5% by weight based on the SCP weight, depends on the operating conditions being used for the SCP reaction and crystallization. For example, in the wet process, sodium carbonate peroxide is prepared from the reaction of sodium carbonate solution containing from 14% to 28% by weight $Na_2CO_3$ and hydrogen peroxide solution containing about 15% to 70%, preferably 50% to 70%, by weight $H_2O_2$, such that the molar ratio of sodium carbonate to hydrogen peroxide is 1.0 to 1.5. The reaction is generally carried out at a pH of from 10 to 12 and at a temperature from 0° C. to 40° C., preferably 25° C. to 35° C. Although the reaction may be operated at atmospheric pressure, preferably a slight vacuum is maintained in continuous commercial reactors to facilitate removal of water by evaporation and to thereby control the temperature in the reaction medium. The reaction and crystallization steps may be either batch or continuous operations, performed separately (in the same or different vessels) or simultaneously (in a single reactor/crystallizer).

Consequently, these operating parameters for the reaction and crystallization, such as reactant concentrations in the aqueous reaction medium and the solution temperature during crystallization, will affect the precise level of stabilizing agent that should be maintained in the aqueous reaction medium to obtain the desired levels of stabilizer incorporated into the SCP. Steady state operation of continuous processes for preparing SCP assures that once the optimum concentration of stabilizer in the aqueous reaction medium is determined (by analysis of the SCP product output) and maintained at that level, further adjustments in the feed rate of stabilizing agent will not be required.

When the process of the present invention is utilized for stabilizing SCP in the preferred wet SCP process, difficulties commonly associated with the prior art silicatetype stabilizers are largely eliminated. The stabilizing agents of the present invention are low foaming, a desirable characteristic for stabilizers utilized in the wet process for manufacturing SCP, which entails a vacuum crystallization technique.

Alternative stabilizer addition methods to the preferred procedure include introduction of the stabilizing agent to the reactant feed used to prepare sodium carbonate peroxide. The stabilizing agent may be added either directly or in aqueous solution to the sodium carbonate feed solution prior to its reaction with hydrogen peroxide to form sodium carbonate peroxide. This procedure is not effective with those stabilizing agents of the present invention, such as the higher molecular weight polyethylene glycols, which are difficultly soluble in concentrated sodium carbonate solutions.

The stabilizing agent may also be incorporated into sodium carbonate peroxide by dissolving SCP solid product in an aqueous solution to which the stabilizing agent is added and thereafter crystallizing and recovering a stabilized SCP product from the solution.

Other means of incorporating a stabilizing agent to the SCP solid will be apparent to persons skilled in the art depending on the particulars of the SCP manufacturing process involved. It should be apparent that various combinations of these procedures may also be used to introduce the stabilizing agent for incorporation into the sodium carbonate peroxide in the method of the present invention. Such alternative methods are intended to be within the scope of the present invention. The sole essential requirement is that the stabilizing agent be incorporated into the structure of the sodium carbonate peroxide solid product in an amount of from 0.01% to 5.0% by weight based on SCP, rather than merely being applied as a coating to the solid SCP.

After the stabilizing agent has been incorporated into the sodium carbonate peroxide, the SCP solid is recovered and dried to obtain a free-flowing stabilized product. Recovery of the stabilized sodium carbonate peroxide requires no special procedures. In the wet process, the crystallized sodium carbonate peroxide is recovered from the aqueous reaction medium by conventional filtration means, either batch, batch-continuous or continuous filtration methods. The mother liquor remaining from the filtration operation is ordinarily recycled because of the sodium carbonate values contained in it. For example, the mother liquor may be combined with makeup sodium carbonate or its solution in a continuous process for preparing SCP, either with or without purification of the mother liquor prior to its reuse.

Recovery of the crystallized sodium carbonate peroxide from the aqueous reaction medium in the wet process for manufacturing SCP is especially facilitated by the stabilizing method of the present invention. The stabilizing agents described in this disclosure (in comparison to prior art silicate-type stabilizers for SCP) provide more readily filterable SCP crystals that allow faster filtration procedures to be used.

The recovery step is followed by drying of the moist sodium carbonate peroxide to obtain a free-flowing stabilized product. The recovery and drying steps may be combined as a single unit operation, if desired. The dried, free-flowing sodium carbonate peroxide should contain, at the maximum, no more than 1% moisture, preferably less than 0.2% residual moisture.

Conventional drying techniques that are used to dry unstabilized SCP are at least equally efficient in processing moist SCP in which is incorporated a stabilizing agent of the present invention. Active oxygen loss of the SCP during the drying operation is minimized by the improved stability that results from the presence of the stabilizing agent incorporated into the SCP. Among the drying procedures that are suitable for reducing the moisture level in the stabilized SCP to the desired level are fluidized bed drying, flash drying, rotary and drum drying and the like. In drying procedures utilizing forced convection, the drying fluid may be heated or unheated air or combustion gases that are inert with respect to the SCP product.

The primary reasons for reducing the moisture content of the stabilized sodium carbonate peroixde product below 1% are (1) to minimize the presence of moisture in the SCP since water is an essential ingredient in the decomposition reaction of sodium carbonate peroxide and (2) to assure a free-flowing, non-sticking and non-agglomerating particulate product.

The stabilized sodium carbonate peroxide products that are provided by use of the present method are characterized by having lower bulk densities than SCP products produced under similar conditions without stabilizers or with silicate-type stabilizers. Bulk densities in the range of 0.5 to 0.6 gm/cm$^3$ are representative values for the SCP prepared in the preferred method of the present invention. These lower bulk densities are preferred for SCP products that are to be formulated into detergent or bleaching compositions by admixing with the solid components of such compositions. Higher bulk density SCP products, such as those obtained in the prior art SCP stabilization methods, are more susceptible to segregation after formulation.

The stabilized sodium carbonate peroxide product that is obtained after the drying operation is normally evaluated for its purity and stability. These analytical results are useful for measuring and comparing the effectiveness of various stabilizing agents, utilized at different concentration levels and incorporated by different addition means to the reaction medium. The purity of the recovered SCP product is determined from the percentage of sodium carbonate peroxide contained therein. The purity of the recovered solid product, as SCP, is a function of the amount of stabilizing agent, if any, incorporated into the solid product and of peroxide decomposition losses in the sodium carbonate peroxide product that may occur during drying and/or storage of the solid product. It should be noted that pure sodium carbonate peroxide analyses as 32.5% by weight hydrogen peroxide and 15.3% by weight availably oxygen, the latter being the amount of oxygen that is available from the peroxide in the SCP. The purity of the solid SCP product, expressed as percent by weight SCP, is calculated from the available oxygen analysis obtained for the recovered SCP product sample.

The yield of the recovered SCP product differs from purity in that the amount of the available oxygen (or hydrogen peroxide) accounted for in the final product is compared with and expressed as a percent of the amount of available oxygen introduced by the hydrogen peroxide reactant charge (assuming stoichiometric or lesser amounts of hydrogen peroxide are used) or by the stoichiometric amount of peroxide that would react with the sodium carbonate reactant charge (assuming an excess of hydrogen peroxide over the stoichiometric amount was used). The yield and purity for a sample of recovered sodium carbonate peroxide product are calculated from the active oxygen analysis of the sample. The active oxygen analysis of an SCP product sample is determined by conventional titration procedures.

The exact physical and/or chemical mechanism by which the stabilizing agents of the present invention function to enhance sodium carbonate peroxide stability is not known. Heavy metals, as mentioned previously, are commonly believed responsible for catalyzing sodium carbonate peroxide decomposition. Yet, analysis of several samples of unstabilized sodium carbonate peroxide in the investigation leading to the present invention established no correlation between the rate of active oxygen loss and the heavy metal (iron and copper) content in the SCP samples.

The stabilizing agents of the present invention appear to affect crystal growth or crystal structure, rather than complexing with and passivating heavy metals in solution. It is theorized that these stabilizing agents may serve, during the crystallization of sodium carbonate peroxide from solution, to inhibit the co-crystallization of sodium carbonate monohydrate, which is suspected of contributing to accelerated SCP decomposition. Furthermore, incorporation of the stabilizing agent into the crystallized sodium carbonate peroxide has been observed to modify the crystal structure of SCP, e.g., creating lattice vacancies and similar crystal defects, such that formation of additional sodium carbonate monohydrate in the crystal structure via decomposition is inhibited or retarded.

The surfactant properties of the stabilizing agents may also play a role in promoting SCP stability by regulating crystal growth, perhaps by allowing higher concentrations of carbonate to be present at the crystal-solution interface because of the cationic nature of some of these stabilizing agents.

The ideas described above are merely theories as to how the stabilizing agents of the present invention may actually function to reduce decomposition in sodium carbonate peroxide. These theories are intended to promote a more complete understanding of the present invention and are not to be construed as limitations in the method of the claimed invention.

The practice of the invention and the advantages provided thereby are further illustrated by the following examples, which are not intended to be limitative:

Comparative Example A

Sodium carbonate peroxide containing no stabilizing agent was prepared in the following manner. To a one-liter plastic beaker equipped with a mechanical stirrer and containing 25 ml of distilled water, the following solutions were simultaneously and gradually added over a 20 to 30 minute period:

(a) 164.7 ml of a 28% by weight solution of FMC Grade 100 soda ash (a commercial grade of sodium carbonate available from FMC Corporation) at ambient temperature (approximately 25° C.) and (b) 79.7 ml of Baker Analyzed Reagent Grade (J. T. Baker Chemical Company) 30% hydrogen peroxide at ambient temperature (approximately 25° C.).

After five minutes a precipitate of sodium carbonate peroxide was observed to begin forming. The solid sodium carbonate peroxide (SCP) product was separated by filtration from the mother liquor. The recovered SCP product was dried under vacuum at room temperature for two hours and then dried in a forced air oven at 60° C. for an additional two hours.

The SCP product yield, calculated on the basis that complete reaction of the hydrogen peroxide feed to SCP, would yield a 100% SCP recovery, was 35.1% by weight. The SCP product purity, expressed as percent SCP, was 97.0% by weight. Decomposition of the sodium carbonate peroxide product at a temperature of 100° C. was observed to be unacceptably high, 22.8% after only 30 minutes.

Results from this and the following Comparative Examples are summarized in Table Ia. None of these Comparative Examples employed the stabilizing agents of the present invention.

Comparative Example B

The procedure of Example A was followed, with two exceptions. First, the FMC Grade 100 soda ash was pretreated with magnesium oxide in the following manner: a 28% by weight sodium carbonate solution was prepared by adding 300 grams of sodium carbonate (FMC Grade 100 soda ash) to 771 ml of distilled water. To this solution was added 0.71 gm of Baker Analyzed Reagent Grade (J. T. Baker Chemical Company) magnesium oxide (MgO). The slurry was stirred for four hours and then filtered through a medium porosity fritted glass filter. Second, the sodium carbonate feed solution consisted of 164.7 ml of the MgO-pretreated 28% by weight sodium carbonate solution diluted with 100 ml of distilled water. This sodium carbonate feed solution was utilized in the procedure described for Example A except that the one-liter beaker did not contain 25 ml water as in Example A.

The SCP product yield was 32.9%, based on the input $H_2O_2$ as SCP, and SCP product purity, as SCP, was 100%. Decomposition of the SCP product was 12.4% after five hours at a temperature of 100° C. The improvement in stability over that obtained for Example A is attributable to the MgO pretreatment of the sodium carbonate charge.

Comparative Example C

The procedure of Example A was followed, except that the FMC Grade 100 soda ash was pretreated with magnesium oxide in the manner as desribed in Example B.

The SCP product yield was 58.6%, based on the input $H_2O_2$ as SCP, and SCP product purity, as SCP was 94%. The improved SCP product yield, in comparison to Example B, appears due to the absence of dilution water in the sodium carbonate feed solution, which permitted the precipitation and recovery of substantially more SCP product from the more concentrated aqueous reaction medium of this Example. Decomposition of the SCP product was 13.5% after five hours at a temperature of 100° C., which is nearly identical to the result obtained in Example B.

Comparative Example D

The procedure of Example A was followed, but Baker Analyzed Reagent Grade (J. T. Baker Chemical Company) sodium carbonate was utilized in place of FMC Grade 100 soda ash.

The SCP product yield was 55.9%, based on the input $H_2O_2$ as SCP, and SCP product purity, as SCP, was 92.4%. Bulk density of the SCP product was 0.72 gm/cm$^3$. Decomposition of the SCP product was 14.8% after five hours at a temperature of 100° C. The higher purity of the reagent grade sodium carbonate appears responsible for the improved stability of the SCP product in comparison to the decomposition result obtained in Example A.

Comparative Example E

The procedure of Example A was followed, except that Baker Analyzed Reagent Grade sodium carbonate was utilized in place of FMC Grade 100 soda ash and the sodium carbonate was pretreated with magnesium oxide in the manner as described in Example B.

The SCP product yield was 59.9%, based on the input $H_2O_2$ as SCP, and SCP product purity, as SCP, was 91.8%. Decomposition of the SCP product was 15.6% after five hours at a temperature of 100° C. These results are similar to those obtained in Example D, indicating that MgO pretreatment of reagent grade sodium carbonate has little effect on the SCP product stability.

EXAMPLE 1

Examples 1 to 13 illustrate the use of various polyethylene glycols as stabilizing agents in the method of this invention. The average molecular weights of the polyethylene glycols used in these examples range from 300 to 20,000. The polyethylene glycols in the molecular weight range from 300 to 6,000 were Carbowax polyethylene glycols marketed by Union Carbide Corporation; the polyethylene glycol having an average molecular weight of 15,000 to 20,000 was obtained from J. T. Baker Chemical Company.

In Example 1 the preparation of sodium carbonate peroxide stabilized with polyethylene glycol followed the same procedure as that used in Example C, in which FMC Grade 100 soda ash was pretreated with magnesium oxide. The polyethylene glycol (PEG) stabilizing agent was added directly to the one-liter plastic beaker that served as a reaction vessel and crystallizer, being added to the 25 ml of distilled water contained in the beaker prior to the addition of the sodium carbonate and hydrogen peroxide reactants.

In this example, 0.4 gm of PEG stabilizing agent having an average molecular weight of 300 was used. This amount of stabilizer, when expressed as a weight percent of the SCP that could theoretically form based on 100% recovery of the input $H_2O_2$ as SCP, was calculated to be 0.5%.

The SCP product yield was 45.8%, based on the input $H_2O_2$ as SCP, and the SCP product purity, as SCP, was 87.5%. Bulk density of the SCP product was 0.57 gm/cm$^3$. Decomposition of the SCP product was 6.3% after three hours at a temperature of 100° C., indicating adequate SCP stability.

Results from this and the following Examples which employ PEG stabilizing agents are summarized in Table Ia.

EXAMPLE 2

The procedure of Example E was followed. The procedure utilized in Example 2 differs from that of Example 1 only in that reagent grade sodium carbonate was substituted for the FMC Grade 100 soda ash used in Example 1. In all other respects the procedures of the two Examples are identical. The stabilizing agent was 0.4 gms of PEG having an average molecular weight of 400. This amount of stabilizer, when expressed as a weight percent of the SCP that could theoretically form based on 100% recovery of the input $H_2O_2$ as SCP, was calculated to be 0.5%.

The SCP product yield was 67.4% based on the input $H_2O_2$ as SCP, and the SCP product purity, as SCP, was 96.1%. Bulk density of the SCP product was 0.67 gm/cm$^3$. Decomposition of the SCP product was low, only 2.8% after five hours at a temperature of 100° C., indicating good SCP stability.

EXAMPLE 3

The procedure of Example 2 was followed, except that the stabilizing agent was 0.4 gms of PEG having an average molecular weight of 600. This amount of stabilizer, when expressed as a weight percent of the SCP that could theoretically form based on 100% recovery of the input $H_2O_2$ as SCP, was calculated to be 0.5%.

The SCP product yield was 64.0%, based on the input $H_2O_2$ as SCP, and the SCP product purity, as SCP, was 97.6%. Bulk density of the SCP product was 0.71 gm/cm$^3$. Decomposition of the SCP product was low, only 1.3% after five hours at a temperature of 100° C.

EXAMPLE 4

The procedure of Example 2 was followed, except that the stabilizing agent was 0.1 gms of PEG having an average molecular weight of 1500. This amount of stabilizer, when expressed as a weight percent of the SCP that could theoretically form based on 100% recovery of the input $H_2O_2$ as SCP, was calculated to be 0.1%.

The SCP product yield was 64.0%, based on the input $H_2O_2$ as SCP, and the SCP product purity, as SCP, was 93.7%. Bulk density of the SCP product was 0.62 gm/cm$^3$. Decomposition of the SCP product was 8.9% after five hours at a temperature of 100° C., indicating fair SCP stability.

EXAMPLE 5

The procedure of Example 2 was followed, except that the stabilizing agent was 0.4 gms of PEG having an average molecular weight of 1500. This amount of stabilizer, when expressed as a weight percent of the SCP that could theoretically form based on 100% recovery of the input $H_2O_2$ as SCP, was calculated to be 0.5%.

The SCP product yield was 51.0%, based on the input $H_2O_2$ as SCP, and the SCP product purity, as SCP, was 99.4%. Bulk density of the SCP product was 0.61 gm/cm$^3$. Decomposition of the SCP product was 4.3% after five hours at a temperature of 100° C., an improvement in SCP stability over that obtained in Example 4 at a lower level of PEG 1500 additive.

EXAMPLE 6

The method by which the PEG 1500 stabilizing agent was added to the reaction medium in this Example differed from the procedure followed in Example 5. The PEG stabilizing agent was first added to 100 ml of distilled water. This solution was then combined with the 164.7 ml of 28% by weight reagent grade sodium carbonate solution. It was noted that at least a portion of the PEG stabilizer was insoluble in the sodium carbonate solution thus prepared. The sodium carbonate feed solution, containing the stabilizer and 100 ml of dilution water, was then added simultaneously and gradually with the hydrogen peroxide solution to the one-liter beaker in the manner as described in Example A.

The stabilizing agent was 0.4 gms of PEG having an average molecular weight of 1500. This amount of stabilizer, when expressed as a weight percent of the SCP that could theoretically form based on 100% recovery of the input $H_2O_2$ as SCP, was calculated to be 0.5%.

The SCP product yield was 31.4%, based on the input $H_2O_2$ as SCP, and the SCP product purity, as SCP, was 94.2%. Bulk density of the SCP product was 0.78 gm/cm$^3$. Decomposition of the SCP product was 17.4% after four hours at a temperature of 100° C. The high rate of decomposition appears attributable to the insolubility of the PEG 1500 stabilizing agent in the sodium carbonate solution.

EXAMPLE 7

The procedure of Example 2 was followed, except that the stabilizing agent was 1.0 gms of PEG having an average molecular weight of 1500. This amount of stabilizer, when expressed as a weight percent of the SCP that could theoretically form based on 100% recovery of the input $H_2O_2$ as SCP, was calculated to be 1.2%.

The SCP product yield was 49.0%, based on the input $H_2O_2$ as SCP, and the SCP product purity, as SCP, was 91.1%. Bulk density of the SCP product was 0.62 gm/cm$^3$. Decomposition of the SCP product was 6.5% after five hours at a temperature of 100° C. Thus, stability of the SCP product was not improved, in comparison with the results obtained in Example 5, by the addition of a larger amount of the PEG 1500 stabilizer.

EXAMPLE 8

The procedure of Example 2 was followed, except that the stabilizing agent was 0.4 gms of PEG having an average molecular weight of 6,000. This amount of stabilizer, when expressed as a weight percent of the SCP that could theoretically form based on 100% recovery of the input $H_2O_2$ as SCP, was calculated to be 0.5%.

The SCP product yield was 59.8%, based on the input $H_2O_2$ as SCP, and the SCP product purity, as SCP, was 96.2%. Bulk density of the SCP product was 0.60 gm/cm$^3$. Decomposition of the SCP product was 7.1% after five hours at a temperature of 100° C., indicating fair SCP stability.

EXAMPLE 9

The procedure of Example 2 was followed, except that the stabilizing agent was 0.4 gms of PEG having an average molecular weight of 6,000. This amount of stabilizer, when expressed as a weight percent of the SCP that could theoretically form based on 100% recovery of the input $H_2O_2$ as SCP, was calculated to be 0.5%.

The SCP product yield was 63.8%, based on the input $H_2O_2$ as SCP, and the SCP product purity, as SCP, was 96.5%. Bulk density of the SCP product was 0.50 gm/cm$^3$. Decomposition of the SCP product was very low, 0.7% after five hours at a temperature of 100° C., indicating excellent SCP stability. This Example, in conjunction with Example 8, illustrates the advantage of combining the stabilization method of the present invention with a magnesium oxide pretreatment of the sodium carbonate feed solution. The SCP product stability thus obtained is clearly superior to that obtained for SCP stabilized by either the present invention or the prior art pretreatment of the sodium carbonate feed solution alone. This advantage is completely unexpected since data for Comparative Examples D and E indicate that the MgO pretreatment of reagent grade sodium carbonate in and of itself has no measurable effect on SCP stability.

EXAMPLE 10

The procedure of Example 2 was followed, except that the stabilizing agent was 0.1 gms of PEG having an average molecular weight of about 15,000 to 20,000. This amount of stabilizer, when expressed as a weight percent of the SCP that could theoretically form based on 100% recovery of the input $H_2O_2$ as SCP, was calculated to be 0.1%.

The SCP product yield was 66.4%, based on the input $H_2O_2$ as SCP, and the SCP product purity, as SCP, was 95.7%. Bulk density of the SCP product was 0.64 gm/cm$^3$. Decomposition of the SCP product was 7.8% after five hours at a temperature of 100° C., indicating fair SCP stability.

EXAMPLE 11

The procedure of Example 2 was followed, except that the stabilizing agent was 0.3 gms of PEG having an average molecular weight of about 15,000 to 20,000. This amount of stabilizer, when expressed as a weight percent of the SCP that could theoretically form based on 100% recovery of the input $H_2O_2$ as SCP, was calculated to be 0.4%.

The SCP product yield was 61.4%, based on the input $H_2O_2$ as SCP, and the SCP product purity, as SCP, was 96.5%. Bulk density of the SCP product was 0.61 gm/cm$^3$. Decomposition of the SCP product was low, 1.6% after five hours at a temperature of 100° C.

EXAMPLE 12

The procedure of Example 2 was followed, except that the stabilizing agent was 0.4 gms of PEG having an average molecular weight of about 15,000 to 20,000. This amount of stabilizer, when expressed as a weight percent of the SCP that could theoretically form based on 100% recovery of the input $H_2O_2$ as SCP, was calculated to be 0.5%.

The SCP product yield was 57.5%, based on the input $H_2O_2$ as SCP, and the SCP product purity, as SCP, was 94.2%. Bulk density of the SCP product was 0.66 gm/cm$^3$. Decomposition of the SCP product was again low, 1.5% after five hours at a temperature of 100° C.

EXAMPLE 13

The procedure of Example 2 was followed, except that the stabilizing agent was 1.0 gms of PEG having an average molecular weight of about 15,000 to 20,000. This amount of stabilizer, when expressed as a weight percent of the SCP that could theoretically form based on 100% recovery of the input $H_2O_2$ as SCP, was calculated to be 1.2%.

The SCP product yield was 58.3%, based on the input $H_2O_2$ as SCP, and the SCP product purity, as SCP, was 92.1%. Bulk density of the SCP product was 0.64 gm/cm$^3$. Decomposition of the SCP product was again low, 1.9% after five hours at a temperature of 100° C.

Examples 10 to 13 indicate that excellent SCP stability is obtained at the three levels of PEG 20,000 stabilizing agent used in Examples 11 to 13, with no significant increase in SCP stability being provided by the higher levels used in Examples 12 and 13. The results of Example 10 indicate that a lesser degree of SCP stability is provided at this lowest level of PEG 20,000 stabilizing agent, suggesting that the effectiveness of the stabilizer is reduced at such lower addition levels.

EXAMPLE 14

Examples 14 to 22 illustrate the use of various polyethoxylated fatty acid tertiary amines as stabilizing agents in the method of this invention. The polyethoxy fatty acid tertiary amines utilized in these Examples are obtained through the Armak Company under the trademark Ethomeen. Ethomeen C/15 contains a cocoanut fatty acid-derived alkyl radical and two polyoxyethylene radicals averaging a total of 5 ethylene oxide units per molecule. Ethomeen C/25 is similar except that the total of ethylene oxide units per molecule averages 15. Ethomeen S/25 and T/25 are similar to Ethomeen C/25, except that the fatty acid alkyl radical is derived from soya and tallow, respectively.

Example 14 followed the procedure of Example E, in which the reagent grade sodium carbonate feed solution was pretreated with magnesium oxide. The stabilizing agent was added directly to the one-liter plastic beaker that served as a reaction vessel and crystallizer, being added to the 25 ml of distilled water contained therein prior to the addition of the sodium carbonate and hydrogen peroxide reactants. Results from this and the following Examples which employ polyethoxylated fatty acid tertiary amines, diamines, and their quaternary ammonium salts are summarized in Table Ib. Comparative Examples A to E summarized in Table Ia, are also intended to provide a basis for evaluation of the data for Examples 14 to 24 in Table Ib.

The stabilizing agent added was 0.1 gm of Ethomeen C/15. This amount of stabilizer, when expressed as a weight percent of the SCP that could theoretically form based on 100% recovery of the input $H_2O_2$ as SCP, was calculated to be 0.1%.

The SCP product yield was 57.4%, based on the input $H_2O_2$ as SCP, and the product purity, as SCP, was 99.4%. Decomposition of the SCP product was low, 2.0% after five hours at a temperature of 100° C., indicating good SCP stability.

EXAMPLE 15

The procedure of Example 14 was followed, except that the stabilizing agent was 0.4 gms of Ethomeen C/15. This amount of stabilizer, when expressed as a weight percent of the SCP that could theoretically form based on 100% recovery of the input $H_2O_2$ as SCP, was calculated to be 0.5%.

The SCP product yield was 52.6%, based on the input $H_2O_2$ as SCP, and the SCP product purity, as SCP, was 98.0%. Decomposition of the SCP product was low, 1.4% after five hours at a temperature of 100° C.

EXAMPLE 16

The procedure of Example 14 was followed, except that the stabilizing agent was 1.0 gms of Ethomeen C/15. This amount of stabilizer, when expressed as a weight percent of the SCP that could theoretically form based on 100% recovery of the input $H_2O_2$ as SCP, was calculated to be 1.2%.

The SCP product yield was 57.7%, based on the input $H_2O_2$ as SCP, and the SCP product purity, as SCP, was 98.7%. Decomposition of the SCP product was low, 1.6% after five hours at a temperature of 100° C.

EXAMPLE 17

The procedure of Example 14 was followed, with two exceptions. First, FMC Grade 100 soda ash was substituted for the reagent grade sodium carbonate used in Example 14. Second, the sodium carbonate feed solution consisted of 164.7 ml of MgO-pretreated 28% by weight sodium carbonate solution diluted with 100 ml of distilled water. This sodium carbonate feed solution was utilized in the procedure of Example 14.

The stabilizing agent was 0.2 gms of Ethomeen C/25. This amount of stabilizer, when expressed as a weight percent of the SCP that could theoretically form based on 100% recovery of the input $H_2O_2$ as SCP, was calculated to be 0.2%.

The SCP product yield was 28.7%, based on the input $H_2O_2$ as SCP, and the SCP product purity, as SCP, was 99.8%. Decomposition of the SCP product was 4.1% after five hours at a temperature of 100° C., indicating fair SCP stability.

EXAMPLE 18

The procedure of Example 17 was followed, except that the stabilizing agent was 0.4 gms of Ethomeen C/25. This amount of stabilizer, when expressed as a weight percent of the SCP that could theoretically form based on 100% recovery of the input $H_2O_2$ as SCP, was calculated to be 0.5%.

The SCP product yield was 27.2%, based on the input $H_2O_2$ as SCP, and the SCP product purity, as SCP, was 99.0%. Decomposition of the SCP product was low, 2.0% after five hours at a temperature of 100° C., indicating good stability.

EXAMPLE 19

The procedure of Example 17 was followed, except that reagent grade sodium carbonate was substituted for the FMC Grade 100 soda ash and the stabilizing agent was 0.4 gms of Ethomeen C/25. This amount of stabilizer, when expressed as a weight percent of the SCP that could theoretically form based on 100% recovery of the input $H_2O_2$ as SCP, was calculated to be 0.5%.

The SCP product yield was 27.8%, based on the input $H_2O_2$ as SCP, and the SCP product purity, as SCP, was 99.9%. The low SCP product yields obtained in Examples 17 to 19 to appear due to the dilution water added to the sodium carbonate feed solution, which resulted in a smaller amount of SCP being precipitated and recovered from the dilute aqueous reaction medium. Decomposition of the SCP product was very low, 0.9% after five hours at a temperature of 100° C., indicating excellent SCP stability.

EXAMPLE 20

The procedure of Example 14 was followed, except that the stabilizing agent was 0.8 gms of Ethomeen C/25. This amount of stabilizer, when expressed as a weight percent of the SCP that cold theoretically form based on 100% recovery of the input $H_2O_2$ as SCP, was calculated to be 1.0%.

The SCP product yield was 57.4%, based on the input $H_2O_2$ as SCP, and the SCP product purity, as SCP, was 95.6%. Decomposition of the SCP product was 3.7% after five hours at a temperature of 100° C., indicating good SCP stability.

EXAMPLE 21

The procedure of Example 14 was followed, except that the stabilizing agent was 0.4 gms of Ethomeen S/25. This amount of stabilizer, when expressed as a weight percent of the SCP that could theoretically form based on 100% recovery of the input $H_2O_2$ as SCP, was calculated to be 0.5%.

The SCP product yield was 52.8%, based on the input $H_2O_2$ as SCP, and the SCP product purity, as SCP, was 85.8%. Decomposition of the SCP product was 5.3% after five hours at a temperature of 100° C., indicating good SCP stability.

EXAMPLE 22

The procedure of Example 14 was followed, except that the stabilizing agent was 0.4 gms of Ethomeen T/25. This amount of stabilizer, when expressed as a weight percent of the SCP that could theoretically form based on 100% recovery of the input $H_2O_2$ as SCP, was calculated to be 0.5%.

The SCP product yield was 57.3%, based on the input $H_2O_2$ as SCP, and the SCP product purity, as SCP, was 97.7%. Decomposition of the SCP product was 2.5% after five hours at a temperature of 100° C., indicating good SCP stability.

EXAMPLE 23

This Example illustrates the use of a polyethoxy fatty acid tertiary diamine as the stabilizing agent in the method of the present invention. The specific compound utilized was Ethoduomeen T/13, obtained from the Armak Company. Ethoduomeen is a derivative of an N-alkyl trimethylene wherein the single N-alkyl radical is derived from a tallow fatty acid and the three polyoxyethylene radicals each contain one ethylene oxide unit.

The procedure of Example 14 was followed, except that the stabilizing agent was 0.4 gms of Ethoduomeen T/13. This amount of stabilizer, when expressed as a weight percent of the SCP that could theoretically form based on 100% recovery of the input $H_2O_2$ as SCP, was calculated to be 0.5%.

The SCP product yield was 57.3%, based on the input $H_2O_2$ as SCP, and the SCP product purity, as SCP, was 94.4%. Decomposition of the SCP product was low, 1.9% after three hours at a temperature of 100° C., indicating good SCP stability.

EXAMPLE 24

The stabilizing agent for this Example illustrates the use of a quaternary ammonium salt, formed by the addition of methyl chloride to a polyethoxy fatty acid tertiary amine. Ethoquad C/12, obtained from the Armak Company, was utilized. This compound, a quaternary ammonium salt of Ethomeen C/12, contains an alkyl radical derived from a cocoanut fatty acid and two polyoxyethylene radicals averaging a total of five ethylene oxide units per molecule.

The procedure of Example 14 was followed, except that the stabilizing agent was 0.4 gms of Ethoquad C/12. This amount of stabilizer, when expressed as a weight percent of the SCP that could theoretically form based on 100% recovery of the input $H_2O_2$ as SCP, was calculated to be 0.5%.

The SCP product yield was 56.9%, based on the input $H_2O_2$ as SCP, and the SCP product purity, as SCP, was 96.4%. Decomposition of the SCP product was 2.9% after five hours at a temperature of 100° C., indicating good SCP stability.

Comparative Example F

This comparative Example illustrates the drawbacks to combining stabilizers chosen from more than one of the groups of stabilizers specified in the method of the present invention. A polyethylene glycol (average molecular weight 1500) and polyethoxy fatty acid tertiary amine (Ethomeen C/25) were added in equal amounts (0.4 gm of each) following the procedure of Example 14.

The SCP product yield was a relatively low 21.8%, based on the input $H_2O_2$ as SCP, and the SCP product purity, as SCP, was 95.1%. Decomposition of the SCP product was high, 26.5% after five hours at a temperature of 100° C., indicating an unacceptably low SCP stability.

The foregoing Examples have been described in this specification for the purpose of illustration and not limitation. Other modifications will be apparent to those skilled in the art based on the disclosures in this specification, and these are intended to be comprehended as within the scope of the invention.

TABLE Ia

DATA FOR STABILIZED SODIUM CARBONATE PEROXIDE (SCP) CONTAINING ETHYLENE OXIDE-DERIVATIVE STABLIZING AGENTS

| Example | Stablizing Agent | Amount of Stablizer Used, % by wt. based on SCP[a] | Sodium Carbonate (SC) Feed Solution | | | Product Yield, % by wt. based on SCP[a] | Product Purity, % by wt. SCP | Product Bulk Density, gm/cm³ | Product Decomposition, % after 5 hrs. at 100° C. |
|---|---|---|---|---|---|---|---|---|---|
| | | | SC Source | MgO Addn. | SC Soln Diluted[f] | | | | |
| A | None | — | Gr 100[b] | No | No | 35.1 | 97.0 | —[e] | 22.8(after 30 min.) |
| B | None | — | Gr 100 | Yes | Yes(100) | 32.9 | 100.0 | —[e] | 12.4 |
| C | None | — | Gr 100 | Yes | No | 58.6 | 94.0 | —[e] | 13.5 |
| D | None | — | RG[c] | No | No | 55.9 | 92.4 | 0.72 | 14.8 |
| E | None | — | RG | Yes | No | 59.9 | 91.8 | 0.66 | 15.6 |
| 1 | PEG 300[d] | 0.5 | Gr 100 | Yes | No | 45.8 | 87.5 | 0.57 | 6.3(after 3 hrs.) |
| 2 | PEG 400 | 0.5 | RG | Yes | No | 67.4 | 96.1 | 0.67 | 2.8 |

TABLE Ia-continued

DATA FOR STABILIZED SODIUM CARBONATE PEROXIDE (SCP) CONTAINING ETHYLENE OXIDE-DERIVATIVE STABLIZING AGENTS

| Example | Stablizing Agent | Amount of Stablizer Used, % by wt. based on SCP[a] | SC Source | MgO Addn. | SC Soln Diluted[f] | Product Yield, % by wt. based on SCP[a] | Product Purity, % by wt. SCP | Product Bulk Density, gm/cm³ | Product Decomposition, % after 5 hrs. at 100° C. |
|---|---|---|---|---|---|---|---|---|---|
| 3 | PEG 600 | 0.5 | RG | Yes | No | 64.0 | 97.6 | 0.71 | 1.3 |
| 4 | PEG 1500 | 0.1 | RG | Yes | NO | 64.0 | 93.7 | 0.62 | 8.9 |
| 5 | PEG 1500 | 0.5 | RG | Yes | No | 51.0 | 99.4 | 0.61 | 4.3 |
| 6 | PEG 1500 | 0.5 | RG | Yes | Yes(100) | 31.4 | 94.2 | 0.78 | 17.4(after 4 hrs.) |
| 7 | PEG 1500 | 1.2 | RG | Yes | No | 49.0 | 91.1 | 0.67 | 6.5 |
| 8 | PEG 6000 | 0.5 | RG | No | No | 59.8 | 96.2 | 0.60 | 7.1 |
| 9 | PEG 6000 | 0.5 | RG | Yes | No | 63.8 | 96.5 | 0.50 | 0.7 |
| 10 | PEG 20,000 | 0.1 | RG | Yes | No | 66.4 | 95.7 | 0.66 | 5.3 |
| 11 | PEG 20,000 | 0.4 | RG | Yes | No | 61.4 | 96.5 | 0.61 | 1.6 |
| 12 | PEG 20,000 | 0.5 | RG | Yes | No | 57.5 | 94.2 | 0.66 | 1.5 |
| 13 | PEG 20,000 | 1.2 | RG | Yes | No | 58.3 | 92.1 | 0.64 | 1.9 |

[a]SCP weight calculated on assumption of 100% reaction of feed $H_2O_2$ to SCP
[b]Gr 100 = FMC grade 100 soda ash
[c]RG = Baker Analyzed Reagent Grade sodium carbonate
[d]PEG 300 - Polyethylene glycol, avg. mol. wt. 300
[e]No data
[f]Amount of dilution water, ml, shown in parentheses TABLE Ib DATA FOR STABLIZED SODIUM CARBONATE PEROXIDE (SCP) CONTAINING ETHYLENE OXIDE-DERIVATIVE STABLIZING AGENTS

| Example | Stablizing Agent | Amount of Stablizer Used, % by wt. based on SCP[a] | SC Source | MgO Addn. | SC Soln. Diluted[j] | Product Yield, % by wt. based on SCP[a] | Product Purity, % by wt. SCP | Product Decomposition, % after 5 hrs. at 100° C. |
|---|---|---|---|---|---|---|---|---|
| 14 | Ethomeen C/15[d] | 0.1 | RG[c] | Yes | No | 57.4 | 99.4 | 2.0 |
| 15 | Ethomeen C/15 | 0.5 | RG | Yes | No | 52.6 | 98.0 | 1.4 |
| 16 | Ethomeen C/15 | 1.2 | RG | Yes | No | 57.7 | 98.7 | 1.6 |
| 17 | Ethomeen C/25[e] | 0.2 | Gr 100[b] | Yes | Yes(100) | 28.7 | 99.8 | 4.1 |
| 18 | Ethomeen C/25 | 0.5 | Gr 100 | Yes | Yes(100) | 27.2 | 99.0 | 2.0 |
| 19 | Ethomeen C/25 | 0.5 | RG | Yes | Yes(100) | 27.8 | 99.9 | 0.9 |
| 20 | Ethomeen C/25 | 1.0 | RG | Yes | No | 57.4 | 95.6 | 3.7 |
| 21 | Ethomeen S/25[f] | 0.5 | RG | Yes | No | 52.8 | 85.8 | 5.3 |
| 22 | Ethomeen T/25[g] | 0.5 | RG | Yes | No | 57.3 | 97.7 | 2.5 |
| 23 | Ethoduomeen T/13[h] | 0.5 | RG | Yes | No | 57.3 | 94.4 | 1.9 (after 3 hrs.) |
| 24 | Ethoquad C/12[i] | 0.5 | RG | Yes | No | 56.9 | 96.4 | 2.9 |
| F | Ethomeen C/25 / PEG 1500 | 0.5 / 0.5 | RG | Yes | Yes(100) | 21.8 | 95.1 | 26.5 |

[a]SCP weight calculated on assumption of 100% reaction of feed $H_2O_2$ to SCP
[b]Gr 100 = FMC Grade 100 soda ash
[c]RG = Baker Analyzed Reagent Grade sodium carbonate
[d]Polyethoxylated (5 moles ethylene oxide) cocoanut fatty acid tertiary amine
[e]Polyethoxylated (15 moles ethylene oxide) cocoanut fatty acid tertiary amine
[f]Polyethoxylated (15 moles ethylene oxide) soya fatty acid tertiary amine
[g]Polyethoxylated (15 moles ethylene oxide) tallow fatty acid tertiary amine
[h]Polyethoxylated (3 moles ethylene oxide) tallow fatty acid tertiary diamine
[i]Polyethoxylated (2 moles ethylene oxide) tallow fatty acid quarternary ammonium salt
[j]Amount of dilution water, ml, shown in parentheses

We claim:

1. A method for the preparation of stabilized sodium carbonate peroxide which comprises incorporating polyethylene glycol having an average molecular weight of about 200 to 50,000 into sodium carbonate peroxide, in an amount equal to 0.01% to 5% by weight based on the weight of sodium carbonate peroxide, and recovering the sodium carbonate peroxide as a dry, free-flowing solid, thereby stabilized against loss of active oxygen.

2. The method of claim 1 wherein the polyethylene glycol has an average molecular weight of about 300 to 20,000.

3. The method of claim 1 wherein the polyethylene glycol has an average molecular weight of about 6,000.

4. The method of claim 1 wherein the polyethylene glycol is incorporated into the sodium carbonate peroxide in an amount equal to 0.05% to 2% by weight based on the weight of sodium carbonate peroxide.

5. The method of claim 1 wherein the recovered sodium carbonate peroxide is dried so as to contain less than 1.0% moisture by weight based on the weight of sodium carbonate peroxide.

* * * * *

UNITED STATES PATENT AND TRADEMARK OFFICE
CERTIFICATE OF CORRECTION

PATENT NO. : 4,316,879
DATED : February 23, 1982
INVENTOR(S) : Michael L. Pinsky, Joseph H. Finley, Charles W. Lutz It is certified that error appears in the above—identified patent and that said Letters Patent is hereby corrected as shown below:

Column 2, line 63, "0.1" should read --0.01--.

Signed and Sealed this

Fourth Day of May 1982

[SEAL]

Attest:

GERALD J. MOSSINGHOFF

*Attesting Officer*     *Commissioner of Patents and Trademarks*